US010562509B2

(12) United States Patent
Antanaitis et al.

(10) Patent No.: US 10,562,509 B2
(45) Date of Patent: Feb. 18, 2020

(54) BRAKE TEMPERATURE MONITORING SYSTEM

(71) Applicant: GM Global Technology Operations LLC, Detroit, MI (US)

(72) Inventors: David B. Antanaitis, Northville, MI (US); Mark T. Riefe, Brighton, MI (US); Chih-hung Yen, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/643,047

(22) Filed: Jul. 6, 2017

(65) Prior Publication Data

US 2019/0009769 A1    Jan. 10, 2019

(51) Int. Cl.
*B60T 17/22* (2006.01)
*G01K 13/02* (2006.01)
(Continued)

(52) U.S. Cl.
CPC .............. *B60T 17/22* (2013.01); *B60T 8/00* (2013.01); *B60T 8/17* (2013.01); *B60W 30/00* (2013.01); *B60W 40/00* (2013.01); *F16D 66/00* (2013.01); *G01K 7/427* (2013.01); *G01K 13/02* (2013.01); *G05D 1/0088* (2013.01); *G07C 5/0825* (2013.01); *B60T 8/326* (2013.01); *B60T 2210/30* (2013.01); *B60T 2250/00* (2013.01);
(Continued)

(58) Field of Classification Search
CPC .. B60T 17/22; B60T 2210/30; B60T 2250/00; G05D 1/0088; G07C 5/0825; G01K 13/02; G01K 2013/026; B60W 2710/184; B60W 2510/184; B60W 30/00; B60W 40/00; B60W 2550/12; B60W 2720/10
See application file for complete search history.

(56) References Cited

U.S. PATENT DOCUMENTS 9,315,178 B1 * 4/2016 Ferguson ............... B60T 17/221
2017/0072932 A1 * 3/2017 Steward ................. B60T 17/221

FOREIGN PATENT DOCUMENTS

GB              2523755 A       9/2015

OTHER PUBLICATIONS

Neys, A, In-vehicle brake system temperature model, Chalmers Univ (Year: 2012).*

* cited by examiner

*Primary Examiner* — Yuen Wong
(74) *Attorney, Agent, or Firm* — Cantor Colburn LLP

(57) ABSTRACT

A brake temperature monitoring system configured to monitor at least one of a rotor and hydraulic fluid of a brake mechanism for a vehicle. The system including a controller including a processor and an electronic storage medium, a vehicle velocity sensor, an ambient temperature sensor, and a pre-programmed module. The vehicle velocity sensor is configured to output a velocity signal to the processor. The ambient temperature sensor is configured to output an ambient temperature signal to the processor. The model is pre-programmed into the electronic storage medium, and is adapted to estimate the temperature of at least one of the rotor and the hydraulic fluid. The estimation is based on an ambient air temperature, and a pre-established relationship between a conductive heat transfer factor and a convective heat transfer factor. The convective heat transfer factor is a function of vehicle velocity.

15 Claims, 5 Drawing Sheets

(51) Int. Cl.
G05D 1/00 (2006.01)
G07C 5/08 (2006.01)
B60W 30/00 (2006.01)
B60W 40/00 (2006.01)
B60T 8/00 (2006.01)
B60T 8/17 (2006.01)
G01K 7/42 (2006.01)
F16D 66/00 (2006.01)
B60T 8/32 (2006.01)

(52) U.S. Cl.
CPC ..... *B60T 2270/406* (2013.01); *B60T 2270/86* (2013.01); *B60W 2510/184* (2013.01); *B60W 2550/12* (2013.01); *B60W 2710/184* (2013.01); *B60W 2720/10* (2013.01); *F16D 2066/001* (2013.01); *G01K 2013/026* (2013.01); *G01K 2205/00* (2013.01)

BRAKE TEMPERATURE MONITORING SYSTEM

INTRODUCTION

The subject disclosure relates to a brake temperature monitoring system, and more particularly, to a brake fluid temperature monitoring system of a brake mechanism.

Traditional hydraulic brake mechanisms, which may include vehicle brake systems, motor-gear units (i.e., motor on caliper) and motor drive units (i.e., electro-mechanical brake), may utilize hydraulic fluid based systems actuated by an operator and/or controller. In the example of a vehicle brake system, the operator may depress a brake pedal that generally actuates a master cylinder. In-turn, the master cylinder pressurizes hydraulic fluid in a series of hydraulic fluid lines routed to respective actuators at brakes located adjacent to each wheel of the vehicle.

When designing a hydraulic brake mechanism for a particular application, cumbersome empirical data must be accumulated in a laboratory environment to assure the mechanism does not overheat through repeated braking cycles at various conditions. For example, the friction produced between a caliper and brake pads when actuated may heat the caliper, brake pads and surrounding components. In turn, the heated components may cause an undesired elevated temperature and/or boiling of the hydraulic fluid.

It is desirable to reduce the collection of empirical data during the design phase of a brake mechanism, to optimize robustness and durability of the brake mechanism, reduce design complexity and/or sensors and wires, and produce smarter brake mechanisms capable of predicting elevated temperature conditions during normal operation.

SUMMARY

A brake temperature monitoring system according to one, non-limiting, embodiment of the present disclosure is configured to monitor at least one of a rotor and hydraulic fluid of a brake mechanism for a vehicle. The system includes a controller, a vehicle sensor, an ambient temperature sensor, and a model. The controller includes a processor and an electronic storage medium. The vehicle velocity sensor is configured to output a velocity signal to the processor. The ambient temperature sensor is configured to output an ambient temperature signal to the processor. The model is pre-programmed into the electronic storage medium, and is adapted to estimate the temperature of at least one of the rotor and the hydraulic fluid based on an ambient temperature measured by the ambient temperature sensor and a pre-established relationship between a conductive heat transfer factor and a convective heat transfer factor. The convective heat transfer factor is a function of vehicle velocity measured by the vehicle velocity sensor.

Additionally to the foregoing embodiment, the convective heat transfer factor is a linear function of the vehicle velocity.

In the alternative or additionally thereto, in the foregoing embodiment, the slope of the linear function is approximated as being substantially the same as a slope of brake rotor cooling versus vehicle velocity.

In the alternative or additionally thereto, in the foregoing embodiment, the model includes conductive heat transfer from the rotor, through a caliper of the brake mechanism and to the hydraulic fluid, and further includes convective heat transfer from the caliper and to ambient air.

In the alternative or additionally thereto, in the foregoing embodiment, the brake temperature monitoring system includes a warning device configured to initiate if the estimated hydraulic fluid temperature exceeds a threshold temperature preprogrammed into the electronic storage medium.

In the alternative or additionally thereto, in the foregoing embodiment, the brake temperature monitoring system includes a Driver Information Center (DIC) display configured to display the estimated hydraulic fluid temperature.

In the alternative or additionally thereto, in the foregoing embodiment, the estimated hydraulic fluid temperature is continuously displayed on the DIC display.

In the alternative or additionally thereto, in the foregoing embodiment, the model is trained to establish the relationship between the conductive heat transfer factor and the convective heat transfer factor.

A vehicle according to another, non-limiting, embodiment includes a vehicle velocity sensor, an ambient temperature sensor, a brake mechanism, a controller, and a model. The vehicle velocity sensor is configured to output a velocity signal. The ambient temperature sensor is configured to output an ambient temperature signal. The brake mechanism includes a rotor, a caliper, and hydraulic fluid. The controller includes a processor and an electronic storage medium. The processor is configured to receive and process the velocity and ambient temperature signals. The model is pre-programmed into the electronic storage medium, and is adapted to estimate the temperature of at least one of the rotor and the hydraulic fluid based on an ambient temperature measured by the ambient temperature sensor and a pre-established relationship between a conductive heat transfer factor and a convective heat transfer factor. The convective heat transfer factor is a function of vehicle velocity measured by the vehicle velocity sensor.

Additionally to the foregoing embodiment, the vehicle includes a warning device in communication with the controller and configured to initiate if the estimated hydraulic fluid temperature exceeds a threshold temperature preprogrammed into the electronic storage medium.

In the alternative or additionally thereto, in the foregoing embodiment, the vehicle includes a Driver Information Center (DIC) display in communication with the controller and configured to display the estimated hydraulic fluid temperature.

In the alternative or additionally thereto, in the foregoing embodiment, the estimated hydraulic fluid temperature is continuously displayed on the DIC display.

In the alternative or additionally thereto, in the foregoing embodiment, the vehicle is a performance vehicle.

In the alternative or additionally thereto, in the foregoing embodiment, the vehicle is an autonomous vehicle and the controller is configure to reduce vehicle velocity if the estimated temperature of the hydraulic fluid is greater than a preprogrammed threshold temperature.

A computer program product according to another, non-limiting, embodiment estimates hydraulic fluid temperature of a brake mechanism. The computer program product includes a preprogrammed model configured to estimate the temperature of hydraulic fluid based on an ambient temperature and a pre-established relationship between a conductive heat transfer factor and a convective heat transfer factor. The convective heat transfer factor is a function of air velocity.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
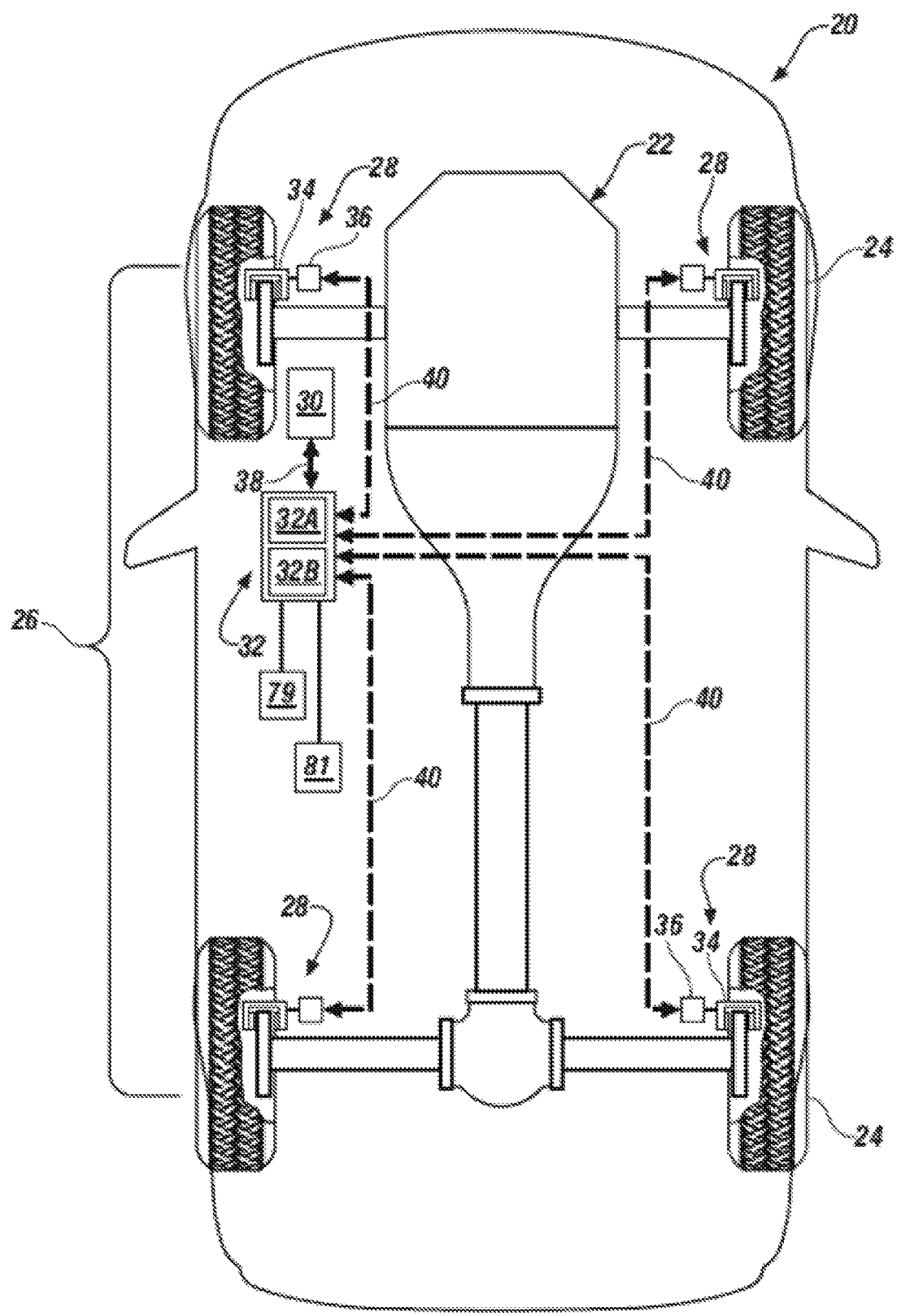
FIG. 1 is a schematic of a vehicle utilizing a brake temperature monitoring system as one non-limiting example in accordance with the present disclosure.

The following description is merely exemplary in nature and is not intended to limit the present disclosure, its application or uses. It should be understood that throughout the drawings, corresponding reference numerals indicate like or corresponding parts and features. As used herein, the terms module and controller refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Referring to FIG. 1, a non-limiting, exemplary, embodiment of a vehicle 20 is illustrated as one, non-limiting example of a brake mechanism 34 application. The vehicle 20 may include a powertrain 22 (i.e., an engine, transmission and differential), a plurality of rotating wheels 24 (i.e., four illustrated), and a hydraulic brake system 26 that may, at least in-part, be a brake-by-wire (BBW) system. The powertrain 22 is adapted to drive at least one of the wheels 24 thereby propelling the vehicle 20 upon a surface (e.g., road). The hydraulic brake system 26 is configured to generally slow the speed and/or stop motion of the vehicle 20, and may include a brake assembly 28 for each respective wheel 24, a brake pedal device 30, and a controller 32. The vehicle 20 may be a racing vehicle, and/or may be an automobile, truck, van, sport utility vehicle, or any other self-propelled or towed conveyance suitable for transporting a burden.

Figure 2:
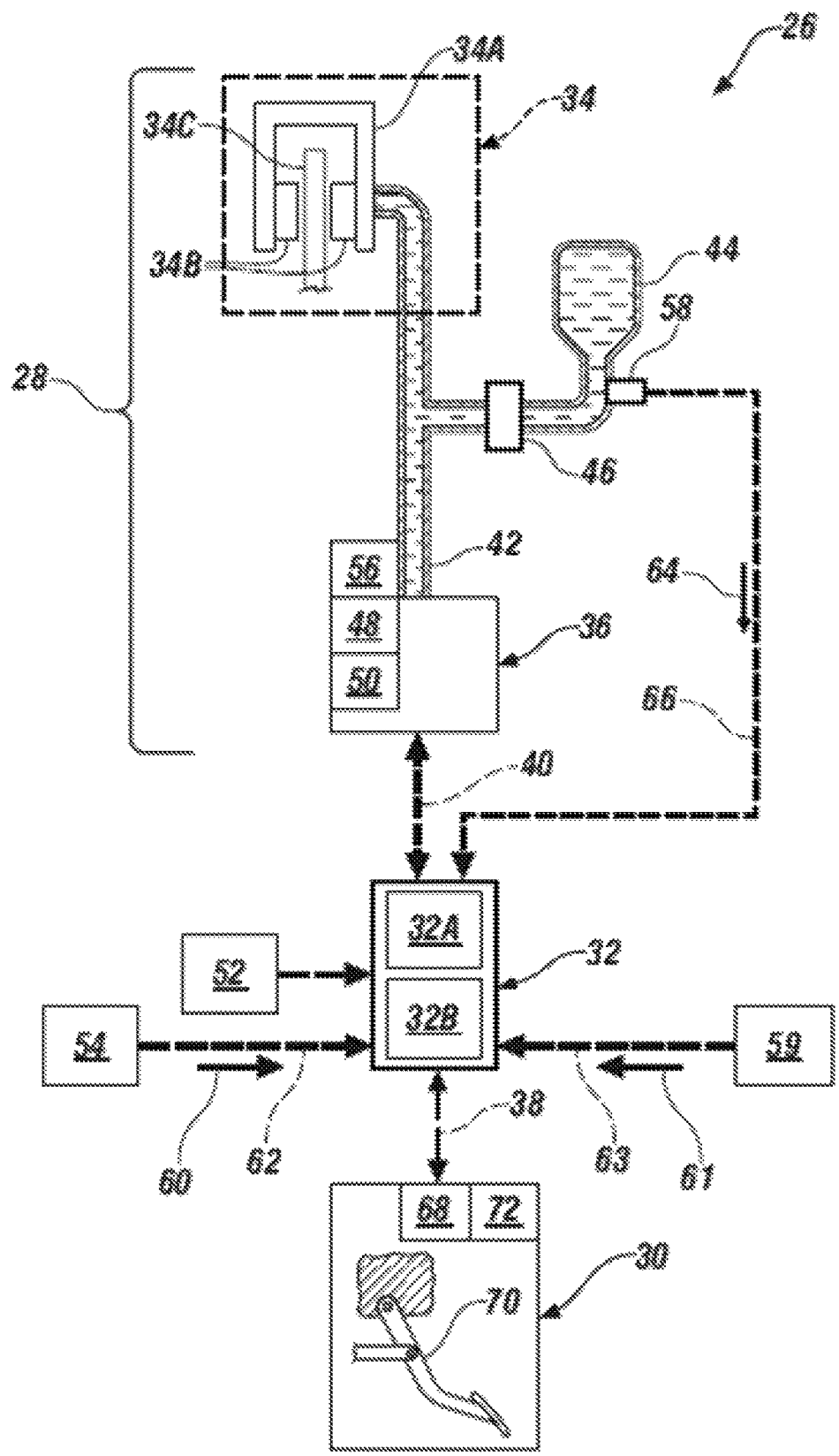
FIG. 2 is a schematic of a hydraulic brake system of the vehicle.

Referring to FIG. 2, with continuing reference to FIG. 1, each brake assembly 28 of the hydraulic brake system 26 may include a brake mechanism 34 and an actuator 36 configured to operate the brake mechanism. In one example, the brake mechanism 34 may include a caliper 34A, opposing brake pads 34B, and a rotating brake disc 34C. Although illustrated as a disc brake, the brake mechanism 34 may be any type of brake including a drum brake, and others. As non-limiting examples, the actuator 36 may be an electro-hydraulic brake actuator (EHBA) or other actuator capable of actuating the brake mechanism 34 based on an electrical input signal that may be received from the controller 32. More specifically, the actuator 36 may be, or may include, any type of motor capable of acting upon a received electric signal, and as a consequence, converting energy into motion that controls movement of the brake mechanism 34. Thus, the actuator 36 may be a direct current motor configured to generate electro-hydraulic pressure delivered to, for example, the calipers of the brake mechanism 34.

In one example, the brake assembly 28 may further include at least one hydraulic line 42 and a hydraulic fluid reservoir 44. The hydraulic line 42 provides fluid communication between the actuator 36 and the caliper 34A. The actuator 36 may be configured to increase pressure in the hydraulic line 42 to actuate the brake mechanism 34 thereby decelerating the vehicle 20. The fluid reservoir 44 adds hydraulic fluid 45 to the hydraulic line 42 to maintain hydraulic pressure. Control of hydraulic fluid makeup may be achieved via a pressure control device 46 disposed generally between, and in communication between the hydraulic fluid line 42 and the reservoir 44. Depending upon operating conditions, the pressure control device 46 may be constructed to flow in either direction. It is further contemplated and understood that the brake assembly 28 may be a closed loop pressure system, may include multiple actuators 36, and may include multiple hydraulic lines 42 in any number of configurations as is known to one having skill in the art.

The hydraulic brake system 26 may further include a multitude of sensors 48, 50, 52, 54, 56, 58, 59 that may be in communication with the controller 32. The sensor 48 may be part of the actuator 36 and may sense actuator position. The sensor 50 may be part of the actuator 36 and may sense actuator apply rate or speed. The sensor 52 may be a brake rate sensor and may be positioned in any variety of locations on the vehicle 20 and may measure vehicle deceleration as is known to one having skill in the art.

The sensor 54 may be an ambient temperature sensor (i.e., ambient air) configured to send an ambient temperature signal (see arrow 60) over a pathway 62 to the controller 32. In one embodiment, the temperature sensor 54 may be a singular sensor located anywhere on the vehicle 20 to measure outside air temperature. In another embodiment, the temperature sensor 54 may actually be multiple sensors (e.g., four sensors) mounted proximate to each respective brake mechanism 34.

The sensor 56 may be generally mounted to the hydraulic line 42 and may measure hydraulic fluid pressure. The sensor 58 may be a displacement sensor. One example of a displacement sensor 58 may be a volumetric sensor used to measure the volume of hydraulic fluid 45 exiting and entering the fluid reservoir 44. The volumetric sensor 58 may further output an electric signal (see arrow 64) indicative of fluid volume, or volume flow rate, over pathway 66 and to the controller 32. The sensor 59 may be a vehicle speed or velocity sensor configured to send a velocity signal (see arrow 61) over a pathway 63 to the controller 32. In an alternative example, the speed sensor 59 may measure the relative speed of the ambient air flowing across the brake mechanism 34 and/or vehicle 20. Further sensors of the hydraulic brake system 26 may be part of the brake pedal device 30 and may include a position sensor 68 that may measure the position of a brake pedal 70 along its stroke path, and may further include a speed or stroke rate sensor 72 that may measure the rate upon which an operator depresses the brake pedal 70.

The controller 32 may include a computer-based processor 32A (e.g., microprocessor) and an electronic storage medium 32B that may be computer readable and writeable. In operation, the controller 32 may receive one or more electrical signals from the brake pedal position and stroke rate sensors 68, 72 of the brake pedal device 30 over a pathway (see arrow 38) indicative of operator braking intent. In-turn, the controller 32 may process such signals, and based at least in-part on those signals, output an electrical command signal to the brake actuators 36 over a pathway (see arrow 40). The pathways 38, 40, 62, 63, 66 may be wired pathways, wireless pathways, or a combination of both. Non-limiting examples of the controller 32 may include an arithmetic logic unit that performs arithmetic and logical operations; an electronic control unit that extracts, decodes, and executes instructions from a memory; and, an array unit that utilizes multiple parallel computing elements. Other examples of the controller 32 may include an engine control module, and an application specific integrated circuit. It is further contemplated and understood that the controller 32 may include redundant controllers, and/or the system may include other redundancies, to improve reliability of the hydraulic brake system 26.

Figure 3:
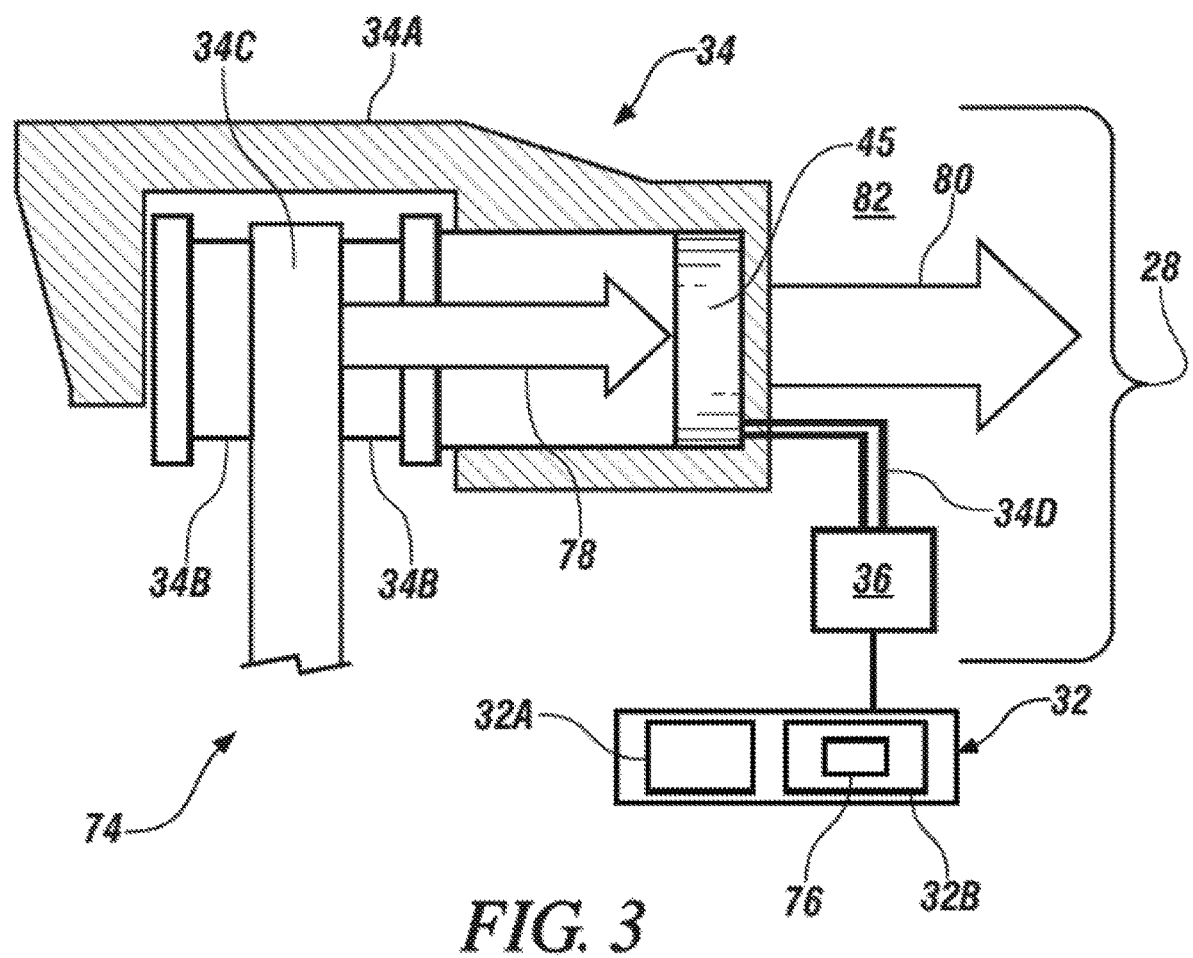
FIG. 3 is a schematic of a brake mechanism of the hydraulic brake system.

Referring to FIG. 3, a brake temperature monitoring system 74 generally provides a physics-based model for predicting temperatures of the hydraulic fluid 45 and other brake component temperatures relative to the hydraulic brake mechanism 34. More specifically, the brake temperature monitoring system 74 is physics-based, (i.e., generally not empirical-based) and is configured to derive certain heat transfer coefficients toward establishing a model 76 of the brake temperature monitoring system 74 that applies an algorithm. In general, the model 76 takes into account heat transfer, substantially by way of conduction (see arrow 78), from the brake rotor 34C, through the brake pad 34B, through the caliper 34A (i.e. caliper piston), and into the hydraulic fluid 45. Moreover, the model 76 takes into account heat transfer, by way of convection (see arrow 80), from the caliper 34A, and/or other components generally containing the hydraulic fluid 45, and to ambient air 82. The term "physics-based model" means the model has real physical meaning in the sense that the model is derivable from both conduction and convection heat transfer.

The model 76 may be stored in the electronic storage medium 32B of the controller 32, may be software-based, and is applied to predict hydraulic fluid temperatures and other component temperatures of the brake mechanism 34. The model may be trainable and applies vehicle speed as one factor (i.e., is a function of vehicle speed).

In general, the brake temperature monitoring system 74 may include the brake mechanism 34, the hydraulic fluid 45, the hydraulic line(s) 42, the controller 32, and the model 76. The model 76 may generally apply the following equations:

$$k(T_R - T_C) = h(T_C - T_A) \quad (1)$$

$$\gamma = h/k = (T_R - T_C)/(T_C - T_A) \quad (2)$$

$$\Delta T_C = \Delta t \cdot [k(T_{R,t} - T_{C,t}) - h(V) \cdot (T_{C,t} - T_{A,t})]/(m_C \cdot C_p) \quad (3A)$$

$$\Delta T_F = \Delta t \cdot [k(T_{R,t} - T_{F,t}) - h(V)(T_{F,t} - T_{A,t})]/(m_C \cdot C_p) \quad (3B)$$

$$T_{C,t+1} = T_{C,t} + \Delta T_C \quad (4A)$$

$$T_{F,t+1} = T_{F,t} + \Delta T_F \quad (4B)$$

Where equation (1) applies when the system reaches equilibrium. Where "h" is a function of speed. However, for an equilibrium test, "h" will be represented as a constant value related to a single average speed applied during the equilibrium test to develop the model. That is, this is used to develop the initial "judgement" at the "h/k" ratio (gamma). An "h" vs. speed relationship is either determined by testing, by modeling, or by estimating as similar to rotor cooling vs. speed (an easily measured relationship). Where "$T_R$" is the thermally stabilized brake rotor temperature (i.e., $T_{R,t}$=temperature at time t). "$T_F$" is the thermally stabilized brake fluid, or caliper component, temperature (i.e., $T_{F,t}$=temperature at time t). "$T_A$" is the temperature of the surrounding ambient space (i.e., $T_{A,t}$=temperature at time t) that may be measured by the ambient temperature sensor 54. "k" is the conductive heat transfer factor where:

$$k = KA/s \quad (5)$$

Where "K" is the heat transfer coefficient, "A" is the working area of a component, and "s" is the material thickness of the component. "h(V)" is the convective heat transfer factor:

$$h(V) = HA \quad (6)$$

Where "H" is the convective heat transfer coefficient and "A" is the working area, and V is the velocity of, for example, the vehicle 20 that may be measured by the velocity sensor 59. "m" is the net working mass of, for example, the caliper 34A. "$C_p$" is the net specific heat capacity of the caliper 34A.

Figures 4, 5, 6:
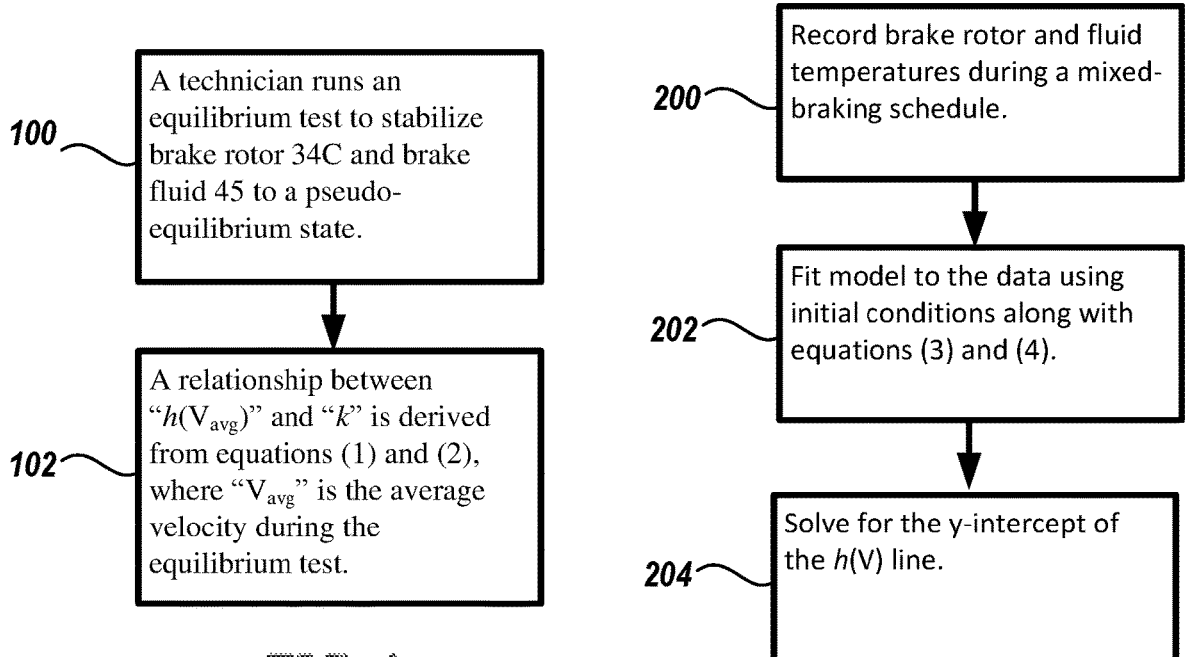
FIG. 4 is a flow chart illustrating phase one of a method of training a model of the brake temperature monitoring system.
FIG. 5 is a flow chart illustrating phase two of the method of training the model.
FIG. 6 is a flow chart illustrating a method of validating the model.

Referring to FIG. 4, a first phase of a method of training the brake temperature monitoring system 74 is illustrated. That is, the first phase is an initial attempt at establishing an empirical model for "γ" (see eq. 2), which is a function of vehicle velocity "V". At block 100, and in one example, a technician within a laboratory environment may run an equilibrium test, or simulation, to stabilize brake rotor 34C and brake fluid 45 to a pseudo-equilibrium state. At block 102, a relationship between "$h(V_{avg})$" and "k" may be derived from equations (1) and (2), where "$V_{avg}$" is the average velocity during the equilibrium test. In general, equations (1) and (2) are used in the first training step. In the second step, "h" is allowed to vary with speed.

Referring to FIG. 5, and after the first phase of the method of training the brake temperature monitoring system 74 is completed, a second phase of the model training may be implemented. The second phase of training may begin with block 200, which includes recording brake rotor and fluid temperatures during a mixed-braking schedule (i.e., different braking speeds, deceleration, and intervals between brake applies). For this step, the technician may utilize strategically placed rotor and fluid temperature sensors that may not be part of the vehicle 20, and/or brake mechanism 34, when sold through the marketplace.

At block 202, the model 76 is fitted to the data using initial conditions along with equations (3) and (4). That is, "h(V)" is a linear function of "h" versus vehicle velocity "V" where vehicle velocity may be measured by velocity sensor 59. The slope of this linear relationship is approximated as the same that brake rotor cooling versus vehicle velocity follows (i.e., with units being 1/sec). At block 204, the y-intercept of the "h(V)" line that minimizes the sum-of-squares error between the model 76 and the phase two training data is solved.

Referring to FIG. 6, phase three of laboratory testing or model development is illustrated wherein the model 76 established in phase two is validated in phase three. At block 300, brake rotor temperature and fluid temperatures may be recorded using laboratory temperature sensors during various mixed-braking schedule. At block 302, model accuracy may be confirmed using the latest dataset(s) from block 300 while making no additional changes to the model coefficients "k" and "h" established in phase two. At block 304, if model accuracy is not sufficient, the laboratory process returns to phase two, and the training data, or model coefficients are adjusted to improve performance. At this step, and because working mass "$m_c$" is an approximation, the working mass may be further tuned within reason.

Figure 7:
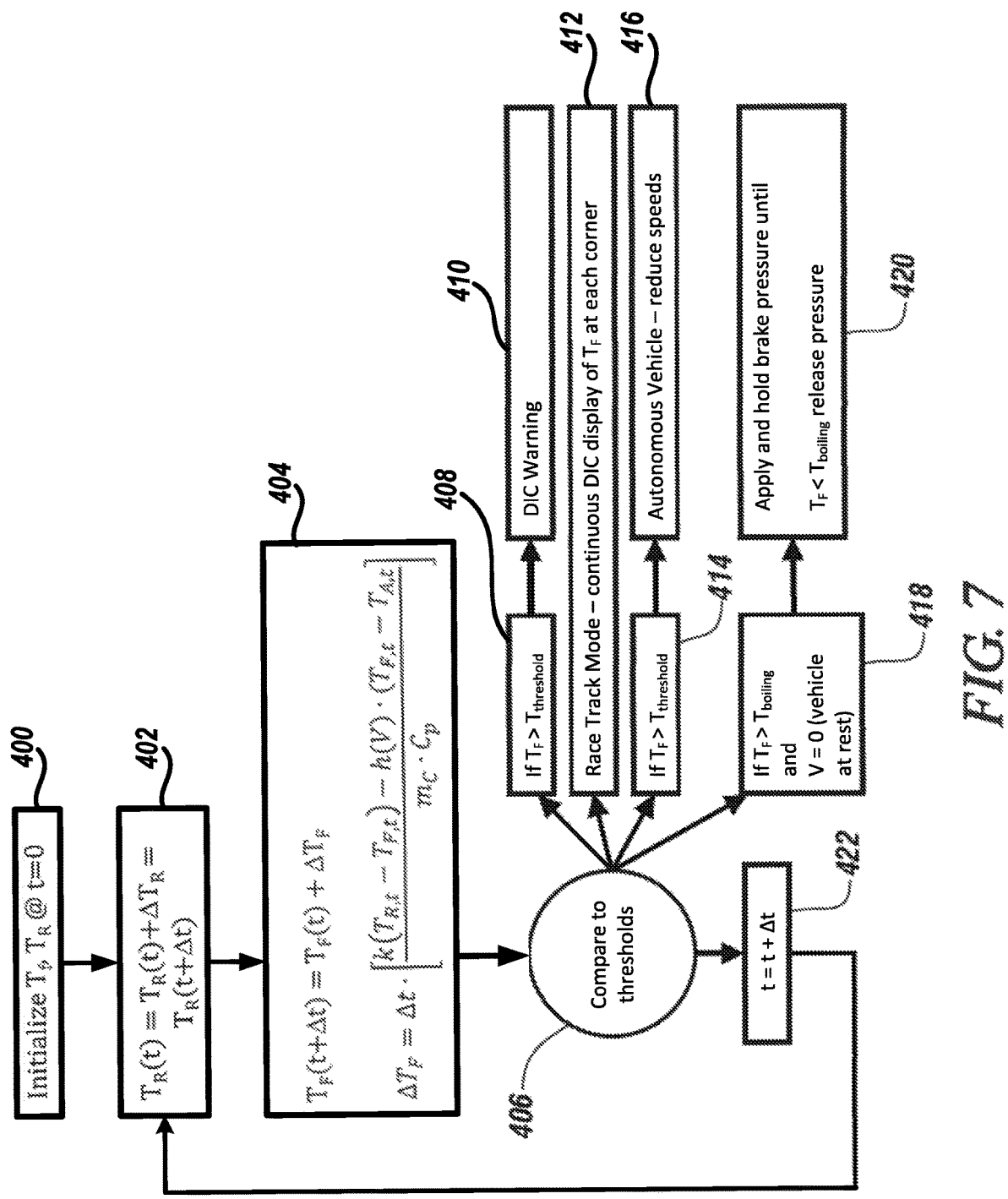
FIG. 7 is a flow chart illustrating a method of operating the brake temperature monitoring system.

Referring to FIG. 7, a method of applying the model 76, thereby estimating hydraulic fluid temperature (i.e., without a local fluid temperature sensor), is generally illustrated. A block 400, the temperature of the fluid "$T_F$" and the temperature of the rotor "$T_R$" is initialized at time equal to zero (t=0). That is, the temperatures are initialized at key-up. "$T_F$" and "$T_R$" may be initially set to a default value (e.g., about twenty (20) degrees Celsius), and/or the system may store and utilize the latest calculated values at key-on/key-off. The same rotor cooling model used during operation may be used to determine the rotor temperature at key-up. By storing the last computed temperature value, measuring the key-off time, and modeling rotor heat loss at zero speed, the new temperature at key-up may be determined. At block 402, the temperature of the rotor 34C at time "t" may be calculated using prior art models known to one having skill in the art. This particular calculation of the rotor temperature is generally calculated using conductive heat transfer principles, and not convection principles. Therefore, vehicle velocity "V" may not be a function. The relevant equation is:

$$T_R(t)=T_R(t)+\Delta T_R=T_R(t+\Delta t) \quad (7)$$

At block 404, the vehicle velocity "V" is determined via the velocity sensor 59, the ambient temperature is determined via the ambient temperature sensor 54, and the model 76 is then applied to calculate hydraulic fluid temperature (see eq. 3B) and/or other components (see eq. 3A) of the caliper 34A. The values for "k" and "h(V)" are determined from the model training process previously described, while the values for "$m_C$" and "$C_p$" are derived from caliper design and material properties. At block 406, and in the example of the brake temperature monitoring system 74 solving for the temperature "$T_F$" of the hydraulic fluid 45, the system may divert to multiple courses and/or multiple embodiments/options.

For example, at block 408 the estimated hydraulic fluid temperature "$T_F$" may be compared to a pre-established, or preprogrammed, temperature threshold "$T_{threshold}$" established to protect or preserve the braking mechanism 34. If:

$$T_F > T_{threshold} \quad (8)$$

then at block 410, the system may initialize a warning (e.g., Driver Information Center (DIC) warning) to, for example, an operator of the vehicle 20 and via a warning device 79 (see FIG. 1) that may be audible and/or visual.

From block 406 and at block 412, an embodiment of the brake temperature monitoring system 74 may be applied to a Race Track Mode (i.e., a performance vehicle). In such a mode, or application, the calculated fluid temperature "$T_F$" may be continuously displayed on a Driver Information Center (DIC) display 81 (see FIG. 1) for each of the four brake mechanisms 34.

From block 406 and at block 414, if equation (8) is satisfied for an application of an autonomous vehicle 20, then at block 416, the autonomous vehicle 20 may react by reducing speed.

From block 406 and at block 418, if:

$$T_F > T_{boiling} \quad (9)$$

and the vehicle velocity "V" is generally zero, then at block 420 the system 74 may apply, or cause to be applied, the brakes to elevate the pressure of the hydraulic fluid 45 and until:

$$T_F < T_{boiling} \quad (10)$$

From block 406 and at block 422, the system 74 may loop back to block 402 to begin the cycle over at the next time interval "$\Delta t$".

The present disclosure may be a system, a method, and/or a computer program product. The computer program product may include a computer readable storage medium (or media) having computer readable program instructions thereon for causing a processor to carry out aspects of the brake temperature monitoring system 74.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the brake temperature monitoring system 74 may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A brake temperature monitoring system configured to monitor at least one of a rotor and hydraulic fluid of a brake mechanism for a vehicle, the brake temperature monitoring system comprising:
   a controller including a processor and an electronic storage medium;
   a vehicle velocity sensor configured to output a velocity signal to the processor;
   an ambient temperature sensor configured to output an ambient temperature signal to the processor; and
   wherein the controller is adapted to portray the temperature of at least one of the rotor and the hydraulic fluid, based on an ambient temperature measured by the ambient temperature sensor, and a pre-established relationship between a conductive heat transfer factor and a convective heat transfer factor, with the convective heat transfer factor being a function of vehicle velocity measured by the vehicle velocity sensor, wherein the portrayed temperature is developed at least in-part by equation $k(T_R-T_C)=h(T_C-T_A)$ when at thermal equilibrium, and h is a constant value related to a single average speed applied during thermal equilibrium, k is a conductive heat transfer factor, $T_R$ is a brake rotor temperature, $T_C$ is a caliper temperature, and $T_A$ is a surrounding ambient space temperature, wherein the controller is configured to actuate the brake mechanism when the estimated hydraulic fluid temperature is above boiling and the vehicle speed is zero thereby increasing hydraulic fluid pressure.

2. The brake temperature monitoring system set forth in claim 1, wherein the convective heat transfer factor is a linear function of the vehicle velocity.

3. The brake temperature monitoring system set forth in claim 2, wherein the slope of the linear function is approximated as being substantially the same as a slope of brake rotor cooling versus vehicle velocity.

4. The brake temperature monitoring system set forth in claim 1, wherein the model includes conductive heat transfer from the rotor, through a caliper of the brake mechanism and to the hydraulic fluid, and further includes convective heat transfer from the caliper and to ambient air.

5. The brake temperature monitoring system set forth in claim 1, further comprising:
   a warning device configured to initiate when the estimated hydraulic fluid temperature exceeds a threshold temperature preprogrammed into the electronic storage medium.

6. The brake temperature monitoring system set forth in claim 1, further comprising:
   a Driver Information Center (DIC) display configured to display the estimated hydraulic fluid temperature.

7. The brake temperature monitoring system set forth in claim 6, wherein the estimated hydraulic fluid temperature is continuously displayed on the DIC display.

8. The brake temperature monitoring system set forth in claim 1, wherein the model is trained to establish the relationship between the conductive heat transfer factor and the convective heat transfer factor.

9. The brake temperature monitoring system set forth in claim 1, wherein the model development includes an h versus vehicle speed relationship with a slope of the h verse vehicle speed relationship being substantially the same as a slope of a brake rotor cooling versus vehicle speed relationship.

10. A vehicle comprising:
   a vehicle velocity sensor configured to output a velocity signal;
   an ambient temperature sensor configured to output an ambient temperature signal;
   a brake mechanism including a rotor, a caliper, and hydraulic fluid;
   a controller including a processor and an electronic storage medium, wherein the processor is configured to receive and process the velocity and ambient temperature signals; and
   wherein the controller is adapted to estimate the temperature of at least one of the rotor and the hydraulic fluid, based on an ambient temperature measured by the ambient temperature sensor, and a pre-established relationship between a conductive heat transfer factor and a convective heat transfer factor, with the convective heat transfer factor being a function of vehicle velocity measured by the vehicle velocity sensor, wherein the portrayed temperature is developed at least in-part by equation $k(T_R-T_C)=h(T_C-T_A)$ when at thermal equilibrium, and h is a constant value related to a single average vehicle speed applied during thermal equilibrium, k is a conductive heat transfer factor, $T_R$ is a brake rotor temperature, $T_C$ is a caliper temperature, and $T_A$ is a surrounding ambient space temperature, wherein the controller is configured to actuate the brake mechanism when the estimated hydraulic fluid temperature is above boiling and the vehicle speed is zero thereby increasing hydraulic fluid pressure.

11. The vehicle set forth in claim 10, further comprising:
   a warning device in communication with the controller and configured to initiate when the estimated hydraulic fluid temperature exceeds a threshold temperature preprogrammed into the electronic storage medium.

12. The vehicle set forth in claim 10, further comprising:
   a Driver Information Center (DIC) display in communication with the controller and configured to display the estimated hydraulic fluid temperature.

13. The vehicle set forth in claim 12, wherein the estimated hydraulic fluid temperature is continuously displayed on the DIC display.

14. The vehicle set forth in claim 13, wherein the vehicle is a performance vehicle.

15. The vehicle set forth in claim 10, wherein the vehicle is an autonomous vehicle and the controller is configured to reduce vehicle velocity when the estimated temperature of the hydraulic fluid is greater than a preprogrammed threshold temperature.

* * * * *